US008452497B2

(12) United States Patent
Reith et al.

(10) Patent No.: US 8,452,497 B2
(45) Date of Patent: May 28, 2013

(54) METHOD FOR ACTUATING A SHIFTING OPERATION IN AN AUTOMATIC TRANSMISSION OF A UTILITY VEHICLE

(75) Inventors: Ulrich Reith, Schlier (DE); Werner Wolfgang, Ravensburg (DE); Bertram Wengert, Markdorf (DE); Maik Wurthner, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 303 days.

(21) Appl. No.: 13/000,419

(22) PCT Filed: Jun. 18, 2009

(86) PCT No.: PCT/EP2009/057576
§ 371 (c)(1),
(2), (4) Date: Dec. 21, 2010

(87) PCT Pub. No.: WO2010/000620
PCT Pub. Date: Jan. 7, 2010

(65) Prior Publication Data
US 2011/0106385 A1    May 5, 2011

(30) Foreign Application Priority Data
Jul. 3, 2008    (DE) .......................... 10 2008 040 126

(51) Int. Cl.
*F16H 61/18* (2006.01)
*G06F 19/00* (2006.01)
(52) U.S. Cl.
USPC .................. 701/51; 701/56; 701/68; 477/115

(58) Field of Classification Search
USPC .................... 701/51, 52, 53, 56, 68; 477/115, 477/110, 107; 74/335, 336 R
See application file for complete search history.

(56) References Cited

U.S. PATENT DOCUMENTS

| 4,044,634 | A | 8/1977 | Florus et al. |
| 4,852,006 | A | 7/1989 | Speranza |
| 5,582,069 | A * | 12/1996 | Genise ............................ 74/335 |
| 5,638,271 | A | 6/1997 | White et al. |
| 5,884,201 | A * | 3/1999 | Kawai ............................. 701/22 |
| 6,123,644 | A | 9/2000 | Janecke et al. |
| 7,771,315 | B2 | 8/2010 | Kramer et al. |
| 2007/0232445 | A1* | 10/2007 | Yamamoto et al. ............. 477/98 |
| 2008/0096721 | A1* | 4/2008 | Honma et al. ................. 477/120 |

FOREIGN PATENT DOCUMENTS

| DE | 23 38 122 A1 | 2/1975 |
| DE | 28 52 195 C2 | 8/1987 |
| DE | 41 22 083 C2 | 3/2001 |
| DE | 101 38 203 A1 | 4/2003 |
| DE | 10 2004 027 597 A1 | 12/2005 |

* cited by examiner

Primary Examiner — Tan Q Nguyen
(74) Attorney, Agent, or Firm — Davis & Bujold, PLLC

(57) ABSTRACT

A method of controlling a shifting operation in an automatic transmission of a commercial vehicle. A targeted gear and an associated target rotational speed are determined, via a transmission control, depending on predetermined parameters, and the shifting operation is executed upon reaching a determined shifting rotational speed. A shift interlock is activated, at least temporarily, during a downshifting operation when, upon reaching the shifting rotational speed, the determined target rotational speed lies below a predetermined rotational speed limit.

8 Claims, 1 Drawing Sheet

METHOD FOR ACTUATING A SHIFTING OPERATION IN AN AUTOMATIC TRANSMISSION OF A UTILITY VEHICLE

This application is a National Stage completion of PCT/EP2009/057576 filed Jun. 18, 2009, which claims priority from German patent application serial no. 10 2008 040 126.9 filed Jul. 3, 2008.

FIELD OF THE INVENTION

The present invention relates to a method for controlling a shifting operation in an automatic transmission of a commercial vehicle.

BACKGROUND OF THE INVENTION

Commercial vehicles with automatic transmissions are known in vehicle engineering. The vehicles are used in off-road travel, for example in so-called heavy off-road travel. Such uses are possible for construction site vehicles as well as military vehicles in military deployment. The driving strategy for determining the targeted gear that is assigned to the transmission control or transmission electronics is responsible for finding the optimum gear in each situation. In addition to the weight of the vehicle, the currently predominant vehicle resistance is calculated from physical variables such as the current engine torque and vehicle speed. Extremely high vehicle resistances can arise in off-road travel, for example when embarking on a steep slope or in a bog where the wheels of the commercial vehicle are partially sunken. In these driving situations, sudden downshift into a lower gear is triggered when a shifting rotational speed is reached. The engine rotational speed achieved after shifting can be calculated even before the shifting is triggered based on the change in the transmission ratio and the vehicle resistance that is also active during shifting. This is accomplished by determining the target rotational speed for the chosen targeted gear. The calculated target rotational speed thereby yields an upper target rotational speed limit that may not be exceeded. The driving strategy calculates the maximum gear increment without exceeding the upper target rotational speed limit. Given the transmission ratios, it is possible in extreme situations for very low rotational speeds to result after downshifting in which the engine torque is insufficient for continued driving or the vehicle even stops. This yields a disengaged drivetrain that is unforeseeable by the driver which can cause critical driving situations.

For example in the document DE 10 2004 027 597 A1, a method is known for controlling an automatic transmission during a procedure in which the transmission ratio was changed in which the synchronous rotational speed for the new gear or targeted gear lies below the idle of a drive motor connectable to the transmission, and in which a gear-shifting actuator is activated for engaging the new gear when the gear actuation rotational speed has reached a predefined rotational speed window. In the known method, the shifting operation is performed in an upshifting mode in contrast from the previous downshifting mode.

SUMMARY OF THE INVENTION

The object of the invention is to propose a method of the type cited at the onset by way of which the process of a shifting operation is influenced such that critical driving situations are prevented.

Accordingly, a method is proposed for controlling a shifting operation in an automatic transmission of a commercial vehicle, wherein a targeted gear and an associated target rotational speed are determined via a transmission control depending on predetermined parameters, the shifting operation being executed upon reaching a determined shifting rotational speed. According to the invention, a shift interlock, e.g. a downshift interlock, is activated at least temporarily during a shifting operation such as a sudden downshifting operation when, upon reaching the shifting rotational speed, the determined target rotational speed lies below a predetermined rotational speed limit.

In the method according to the invention, a downshifting operation is preferably prevented, or the shift interlock is at least temporarily activated as long as a minimum rotational speed cannot be exceeded. Critical driving situations can be prevented, for example, via the activated shift interlock, and the driving comfort of the vehicle can be thereby significantly enhanced.

Within the scope of an advantageous variant embodiment, the downshift interlock can remain active, for example, when there is sudden downshifting until a new targeted gear is determined in which the calculated target rotational speed lies above the rotational speed limit. In this manner, the method according to the invention can achieve the suppression of sudden downshifting. The intended shifting is accordingly not triggered, and the downshift interlock is therefore activated when the calculated target rotational speed lies below a threshold specified via parameters when the shifting rotational speed or synchronous rotational speed is reached.

Due to the active downshift interlock, the drive train of the vehicle remains engaged, and the drive motor is stalled. Consequently, critical driving situations arising from an unforeseeably disengaged drivetrain can be prevented by the method according to the invention.

According to an advantageous embodiment of the invention, an active downshift interlock can be lifted once a new gear is determinable in which the calculated target rotational speed lies between the upper and lower target rotational speed limits.

The rotational speed limit can preferably be determined as a lower target rotational speed limit, for example depending on predetermined parameters. Specific driving situations and vehicle states can thereby be adequately taken into account. For example, the vehicle weight, vehicle resistance, current engine torque, vehicle speed, etc. can thereby be taken into account. Other parameters can also be used.

According to a further development, the range between the upper target rotational speed and lower target rotational speed limit can be selected depending on the respective driving situations. Other driving strategies are also selectable.

The method proposed according to the invention can also be advantageously employed for a commercial vehicle used in street traffic, for example. The shifting frequency of a vehicle in street traffic, for example in on-road applications, can be reduced using the functionality that is realized by the method according to the invention. This is accomplished in particular when the engine's optimum rotational speed range for the driving situations is specified for the range between the upper and lower target rotational speed limits.

BRIEF DESCRIPTION OF THE DRAWINGS

The invention will be further explained below with reference to drawings. They show.

DETAILED DESCRIPTION OF THE PREFERRED EMBODIMENTS

Figure 1:
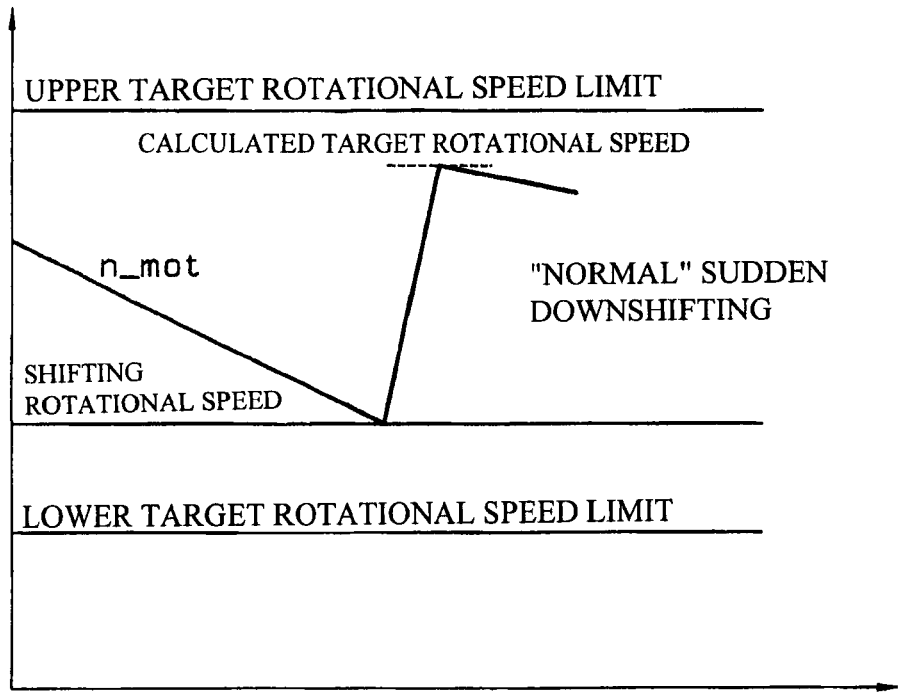
FIG. 1 A diagram of different rotational speed characteristics in the event of sudden downshifting without an active downshift interlock.

FIG. 1 shows a diagram in which the engine rotational speed n_mot is portrayed over time. In the context of a normal sudden downshifting, the engine rotational speed n_mot decreases until the shifting rotational speed is reached. Then downshifting occurs in the context of the shifting operation. The engine rotational speed n_mot is subsequently elevated to the calculated target rotational speed in order to reach the normal rotational speed characteristic. With the normal sudden downshifting shown in FIG. 1, the shifting rotational speed lies above the lower target rotational speed limit. Consequently, the downshift interlock is not activated in this case.

Figure 2:
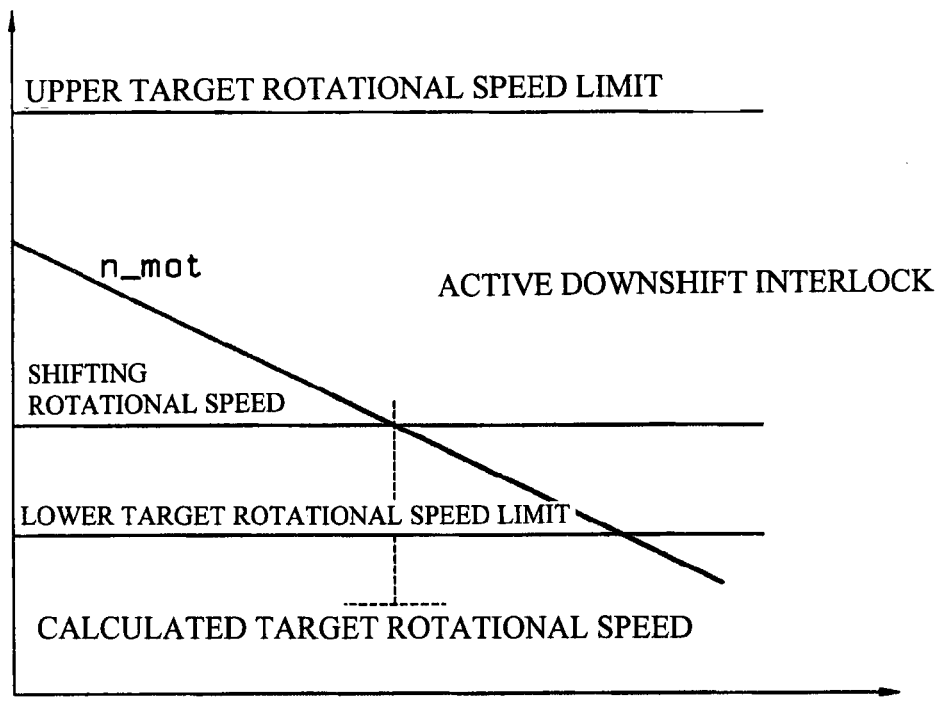
FIG. 2 A diagram of different rotational speed characteristics with an active downshift interlock.

FIG. 2 shows an additional diagram in which the engine rotational speed n_mot is also portrayed over time. However, the engine rotational speed characteristic represents a sudden downshifting with an active downshift interlock. In this case as well, the engine rotational speed n_mot is first reduced until the shifting rotational speed is reached. In contrast to the normal sudden downshifting according to FIG. 1, the calculated target rotational speed lies below the lower target rotational speed limit in this case, however. This means that in the method according to the invention, the downshift interlock is activated so that there is no downshift into the selected targeted gear. The engine rotational speed n_mot is correspondingly reduced further since the drive train remains engaged. The drive motor is then stalled. A driving situation that endangers safety is thereby avoided.

REFERENCE CHARACTERS n Rotational speed
t Time
n_mot Engine rotational speed

The invention claimed is:

1. A method of controlling a shifting operation in an automatic transmission of a commercial vehicle, the method comprising the steps of:
    determining a target gear and an associated target rotational speed via a transmission control depending on at least one of vehicle weight, vehicle drive resistance, engine torque, vehicle speed,
    initiating the shifting operation from a current gear to the target gear when a current rotational speed equals a shifting rotational speed, and
    at least temporarily activating a shift interlock, during a downshifting operation, when the current rotational speed equals the shifting rotational speed, if the determined associated target rotational speed is less than a lower rotational speed limit.

2. The method according to claim 1, further comprising the step of maintaining activation of the downshift interlock when there is sudden downshifting until a new target gear is determined in which an associated target rotational speed of the new target gear is greater than the lower rotational speed limit.

3. The method according to claim 2, further comprising the step of maintaining activation of the downshift interlock and stalling a drive motor of the vehicle by preventing disengagement of the automatic transmission from the drive motor.

4. The method according to claim 2, further comprising the step of deactivating the downshift interlock once a new target gear is determined in which the associated target rotational speed is between an upper rotational speed limit and the lower rotational speed limit.

5. The method according to claim 4, further comprising the step of selecting a range between the upper rotational speed limit and the lower rotational speed limit, depending on a level of the vehicle drive resistance.

6. The method according to claim 1, further comprising the step of determining the lower rotational speed limit based on a change in transmission ratio and the vehicle resistance.

7. The method according to claim 1, further comprising the step of initiating controlling the shifting operation in the automatic transmission of the commercial vehicle when the commercial vehicle is operating in street traffic.

8. A method of controlling a shifting operation in an automatic transmission of a commercial vehicle, the method comprising the steps of:
    controlling the shifting operations of the automatic transmission with transmission control electronics according to a shifting strategy;
    selecting, while in a current gear, a target gear to be shifted into in the shifting operation when a current engine rotational speed equals a shifting rotational speed and calculating a determined engine rotational speed that would result if the target gear is engaged based on at least one of at least one of vehicle weight, vehicle drive resistance, engine torque and vehicle speed;
    executing the shifting operation from the current gear to the target gear when the current engine rotational speed equals the shifting rotational speed and the determined engine rotational speed is greater than a lower rotational speed threshold and less than an upper rotational speed threshold; and
    at least temporarily blocking a downshifting operation when the determined engine rotational speed is below the lower rotational speed threshold;
    selecting, while in the current gear, second target gear to be shifted into in the shifting operation if the determined engine rotational speed is below the lower rotational speed threshold and calculating a further engine rotational speed that would result if the second target gear is engaged based on at least one of at least one of the vehicle weight, the vehicle drive resistance, the engine torque and the vehicle speed; and
    executing the shifting operation from the current gear to the second target gear when the current engine rotational speed equals the shifting rotational speed and the calculated further engine rotational speed is greater than the lower rotational speed threshold and less than the upper rotational speed threshold.

* * * * *